United States Patent
Mellar

(10) Patent No.: US 8,506,260 B2
(45) Date of Patent: Aug. 13, 2013

(54) COMPRESSOR SYSTEM AND METHOD FOR THE OPERATION OF A COMPRESSOR SYSTEM

(75) Inventor: Joerg Mellar, Pliening (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 291 days.

(21) Appl. No.: 12/955,296

(22) Filed: Nov. 29, 2010

(65) Prior Publication Data

US 2011/0070102 A1    Mar. 24, 2011

Related U.S. Application Data

(63) Continuation of application No. PCT/EP2009/003888, filed on May 29, 2009.

(30) Foreign Application Priority Data

May 30, 2008 (DE) .......................... 10 2008 026 028

(51) Int. Cl.
     *F04B 23/08*      (2006.01)

(52) U.S. Cl.
     USPC ............................. 417/205; 417/53; 417/250

(58) Field of Classification Search
     USPC ........................................ 417/205, 250, 53
     See application file for complete search history.

(56) References Cited

U.S. PATENT DOCUMENTS

| | | | | |
|---|---|---|---|---|
| 2,350,896 | A | * | 6/1944 | Jde .................................. 244/59 |
| 3,204,859 | A | * | 9/1965 | Crooks ........................ 417/203 |
| 5,906,480 | A | * | 5/1999 | Sabelstrom et al. .......... 417/364 |
| 6,990,814 | B2 | * | 1/2006 | Boley et al. ..................... 60/611 |
| 7,484,480 | B1 | | 2/2009 | Fornof et al. |
| 2009/0038309 | A1 | | 2/2009 | Cocca et al. |
| 2009/0127926 | A1 | | 5/2009 | Fries et al. |
| 2010/0269799 | A1 | | 10/2010 | Mellar |

FOREIGN PATENT DOCUMENTS

| | | |
|---|---|---|
| DE | 39 09 531 A1 | 6/1990 |
| DE | 196 37 571 A1 | 3/1998 |
| DE | 695 10 177 T2 | 11/1999 |
| DE | 10 2004 005 518 A1 | 9/2005 |
| DE | 10 2006 023 632 A1 | 11/2007 |
| DE | 10 2006 036 017 B4 | 7/2008 |
| DE | 10 2007 037 087 A1 | 2/2009 |
| DE | 10 2007 051 940 A1 | 4/2009 |
| EP | 0 372 154 B1 | 6/1990 |

OTHER PUBLICATIONS

International Search Report dated Nov. 24, 2009 with English translation (four (4) pages).

German Office Action dated Nov. 30, 2009 with English translation (six (6) pages).

* cited by examiner

*Primary Examiner* — Charles Freay

(74) *Attorney, Agent, or Firm* — Crowell & Moring LLP

(57) ABSTRACT

A compressor system includes a compressor for supplying compressed air to a commercial vehicle that has an engine with a turbocharger. Air that is pre-compressed by the turbocharger can be sucked in by the compressor via a first air supply pipe. Ambient air that is not pre-compressed can be sucked in by the compressor via a second air supply pipe. A method operates the compressor system including the compressor for supplying the compressed air to the commercial vehicle that has the engine with the turbocharger accordingly.

11 Claims, 2 Drawing Sheets

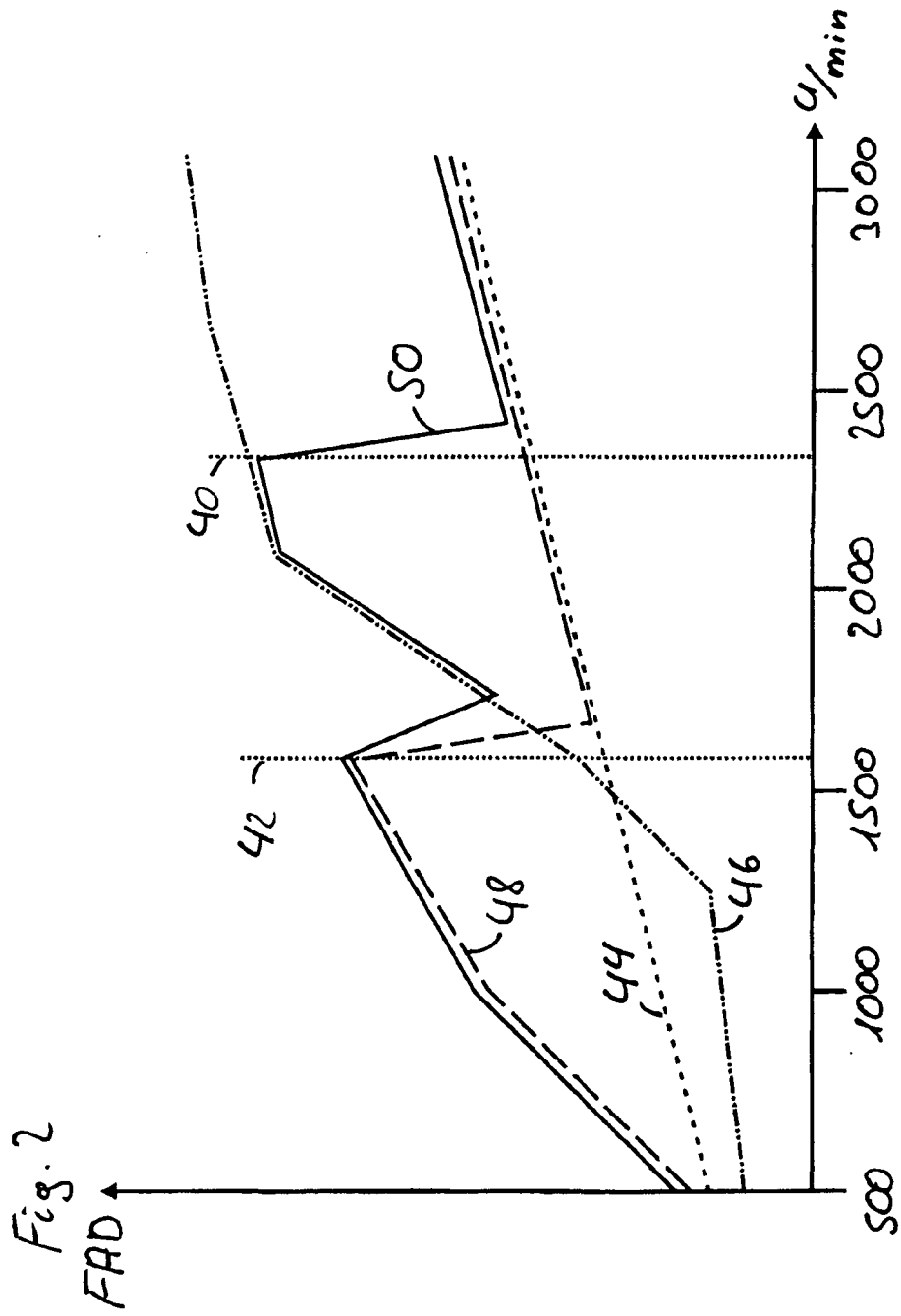

COMPRESSOR SYSTEM AND METHOD FOR THE OPERATION OF A COMPRESSOR SYSTEM

CROSS-REFERENCE TO RELATED APPLICATIONS

This application is a continuation of PCT International Application No. PCT/EP2009/003888, filed May 29, 2009, which claims priority under 35 U.S.C. §119 from German Patent Application No. DE 10 2008 026 028.2, filed May 30, 2008, the entire disclosures of which are herein expressly incorporated by reference.

BACKGROUND AND SUMMARY OF THE INVENTION

The invention relates to a compressor system with a compressor for the supply of compressed air to a commercial vehicle having an engine possessing a turbocharger, air precompressed by the turbocharger being capable of being sucked in by the compressor via a first air feed.

The invention relates, furthermore, to a method for controlling a compressor system with a compressor for the supply of compressed air to a commercial vehicle having an engine possessing a turbocharger.

Modern commercial vehicles, as a rule, have compressed-air-operated subsystems, for example compressed-air-operated service brakes and a pneumatic spring suspension. So that the compressed-air-operated subsystems of the commercial vehicle can be supplied with sufficient compressed air, the commercial vehicle has, furthermore, a compressor for generating the compressed air.

Turbo-charged single-stage and naturally aspirating single-stage compressors are used nowadays. The advantage of the chargeable type of construction is that very large delivery quantities are available. However, it has a large spill chamber, the result of this being that, at low boost pressures of below about 0.2 bar, the delivery quantity is very small. At these low boost pressures, the delivery quantity may even be smaller than in a comparable naturally aspirating compressor. Furthermore, supercharged compressors have the disadvantage in the idling phase that they continue to convey very large air quantities, thus leading to a correspondingly high power consumption.

It is already known to restrict the boost pressure provided for a supercharged compressor to a constant value. These solutions, implemented, for example, by means of diaphragm valves, have low mechanical robustness as a consequence of the principle adopted, since mechanical control and regulating elements have to be placed in the highly pulsating air flow of the air intake path. Moreover, valves of this type themselves cause a throttling action which has an adverse effect on the conveyed air quantity particularly in the case of low boost pressures.

In order to reduce the high power losses of a supercharged compressor which occur in the idling phase, it is known to arrange what is known as a turbo-cut-off valve (TCO valve) in the feed line downstream of the compressor. This turbo-cut-off valve can reduce the conveyed air volume to zero in the idling phase of the supercharged compressor, but is highly sensitive to contamination which may occur.

The object on which the invention is based is to provide a compressor system which, particularly at low boost pressures, conveys a larger air volume.

This object is achieved by a compressor system with a compressor for the supply of compressed air to a commercial vehicle having an engine possessing a turbocharger, air precompressed by the turbocharger being capable of being sucked in by the compressor via a first air feed. Non-precompressed ambient air can be sucked in by the compressor via a second air feed. By providing a second air feed, via which non-precompressed ambient air can be sucked in by the compressor, a compressor which is optimized for the aspiration of non-precompressed ambient air can be used in the compressor system. This leads to a marked increase in the conveyed air quantity even at low boost pressures.

It is advantageous, in this respect, that a charge-air valve device is arranged in the first air feed. The compressor can be protected from excessively high boost pressures by the charge-air valve device in the first air feed. If the boost pressure provided by the turbocharger overshoots an adjustable boost-pressure threshold, the charge-air valve device can shut off the first air feed.

It is particularly preferable, furthermore, that an ambient-air valve device is arranged in the second air feed. By the ambient-air valve device being arranged in the second air feed, non-precompressed ambient air can be fed to the compressor when the boost pressure provided by the turbocharger overshoots the adjustable boost-pressure threshold. In particular, the ambient-air valve device can close the second air feed as long as the boost pressure provided by the turbo charger does not overshoot the boost-pressure threshold.

There is expediently provision made for a pressure sensor to be arranged in the first air feed in order to determine the boost pressure provided by the turbocharger. By arranging a pressure sensor in the first air feed, the boost pressure provided by the turbocharger can be determined directly. The signal generated by the pressure sensor is therefore suitable for serving as a basis for the direct or indirect control of the charge-air valve device or of the ambient-air valve device.

It is contemplated that the compressor includes a spill chamber connectable via a valve device. By providing a connectable spill chamber, pressure peaks which occur particularly at high boost pressures can be reduced. Thus, in particular, the selected adjustable boost-pressure threshold can be higher, without the compressor being overloaded by excessively high pressures.

Advantageously, there is provision for the compressor system to have an electronic control apparatus for the control of functions of the compressor system. An electronic control apparatus can, in a simple way, switch various electrically actuable functions, in particular electrically actuable or pilot-controllable valve devices.

In this case, provision may be made for the electronic control apparatus to include a connection to a CAN bus, and for the electronic control apparatus to receive via the CAN bus the value of the current boost pressure provided by the turbocharger or raw data for calculating the current boost pressure. By being connected to the CAN bus of the vehicle, the electronic control apparatus can ascertain or determine the boost pressure provided by the turbocharger independently of specific sensors.

The generic method is developed further in that, below an adjustable boost-pressure threshold, precompressed air provided by the turbocharger is sucked in by the compressor via a first air feed, and in that, above the adjustable boost-pressure threshold, non-precompressed ambient air is sucked in by the compressor via a second air feed. Thus, the advantages and special features of the compressor system according to the invention are also implemented within the framework of a method for operating a compressor system.

This also applies to the particularly preferred embodiments, specified below, of the method according to the invention.

This is expediently developed further in that, below the adjustable boost-pressure threshold, an ambient-air valve device closes the second air feed. There is in this case expediently provision made for a charge-air valve device to close the first air feed above the adjustable boost-pressure threshold.

It is also contemplated that a valve device connects a spill chamber above an adjustable spill-chamber boost-pressure threshold.

In particular, there may be provision for the boost pressure to be determined via a pressure sensor. There may, however, also be provision made for the boost pressure to be determined from CAN bus data and/or to be transmitted via a CAN bus.

In addition, the first air feed may be closed by the charge-air valve device and the second air feed may be closed by the ambient-air valve device in order to put the compressor into an energy-saving operating state. By the first air feed and the second air feed being shut off simultaneously, the air volume conveyed by the compressor is reduced to zero.

There may be provision, in this respect, for the charge-air valve device and/or the ambient-air valve device to limit an intake underpressure of the compressor by way of a residual leak. By means of a small residual leak which restricts the intake underpressure generated by the compressor, an oil ejection from the compressor due to oil suction can be reduced.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a graph illustrating the conveyed air volume of differently operated compressors as a function of the engine rotational speed.

DETAILED DESCRIPTION OF THE DRAWINGS

Figure 1:
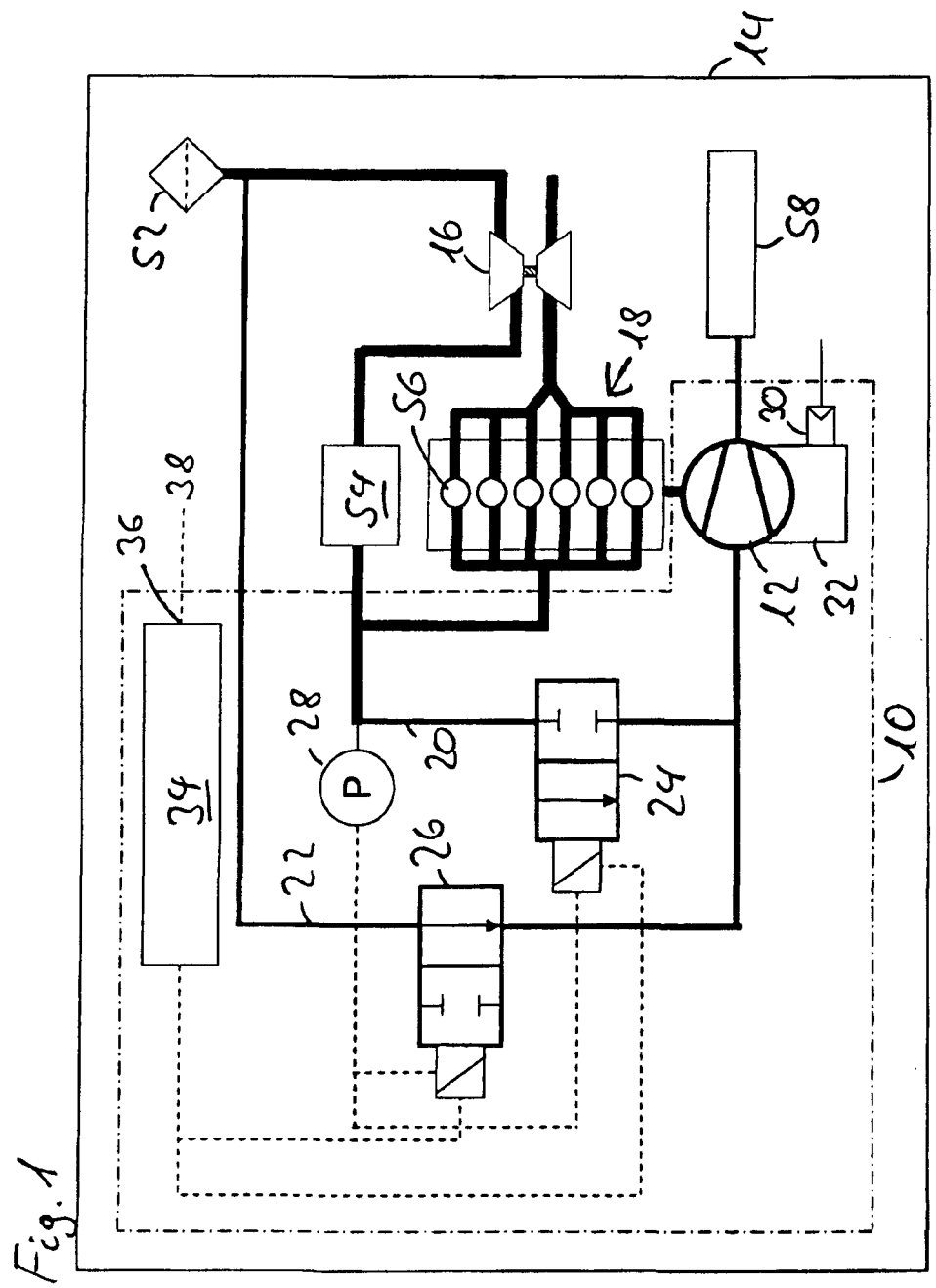
FIG. 1 is a schematic diagram illustrating a commercial vehicle with an engine and with a compressor system according to an embodiment of the invention.

FIG. 1 shows a diagrammatically illustrated commercial vehicle with an engine and with a compressor system. The commercial vehicle 14 includes, in addition to the engine 18 and the compressor system 10, a compressed-air treatment plant having consumers 58, an air filter 52, a charge-air cooler 54 and a turbocharger 16. The compressor system 10 itself includes, in addition to a compressor 12 which may be a single-cylinder or a double-cylinder compressor, an electronic control apparatus 34 with a connection 36 to a CAN bus 38, a first air feed 20 with a charge-air valve device 24 arranged in it and a second air feed 22 with an ambient-air valve device 26 arranged in it. Furthermore, in the first air feed 20, a pressure sensor 28 is arranged, which determines the boost pressure provided by the turbocharger 16, upstream of the charge-air valve device 24.

As a function of the switching states of the charge-air valve device 24 and of the ambient-air valve device 26, the compressor 12 already sucks in air precompressed by the turbocharger 16 via the first air feed 20 or non-precompressed ambient air via the second air feed 22. At least one of the two air feeds 20, 22 is in this case always closed completely. When the charge-air valve device 24 and the ambient-air valve device 26 are in their switching positions illustrated in FIG. 1, the compressor 12 sucks in ambient air via the air filter 52 and the second air feed 22. When both the charge-air valve device 24 and the ambient-air valve device 26 are transferred into their opposite switching states (not illustrated), the compressor 12 sucks in air already precompressed by the turbocharger 16 via the air filter 52, the turbocharger 16, the charge-air cooler 54 and the first air feed 20. Since the boost pressure is increased with respect to the ambient pressure, then in this case the air volume per unit of time conveyed by the compressor 12 rises when the rotational speed of the compressor 12 remains the same.

The turbocharger 16 is driven by the exhaust gases from the engine 18, and the main task of the turbocharger 16 is to be seen in supercharging the engine 18, that is to say the six (6) cylinders 56 of the illustrated engine are operated with a larger quantity of combustion air. The drive of the compressor 12 takes place by way of the engine 18 in a manner known to the person skilled in the art. For example, the compressor 12 may be driven by the engine 18 via a wheel mechanism.

The compressed air conveyed by the compressor 12 is fed to the compressed-air treatment plant having consumers 58. The compressed-air treatment plant having consumers 58 includes, in particular, a compressed-air treatment plant known to a person skilled in the art and a plurality of consumer circuits, which are safeguarded with respect to one another by way of a multi-circuit safety valve and which are connected to the individual consumers.

The compressor 12 has, furthermore, a spill chamber 32, of about 10 ccm per cylinder, which is connectable by a valve device 30, in order to mitigate pressure peaks during the conveyance of compressed air. What is designated in general as a spill chamber 32 may be spatial volume which is connected to a piston chamber of the compressor and which is left over at the end of a compression stroke of the compressor. The connection of a spill chamber 32 therefore lowers the maximum possible compression of the compressor and consequently lowers the pressure peaks occurring during a compression stroke.

If only the ambient-air valve device 26 is transferred into its switching state not illustrated and the charge-air valve device 24 remains in its switching state illustrated, then both the first air feed 20 and the second air feed 22 are shut off. In this switching state of the compressor system 10, the compressor 12 cannot suck in any air and consequently also can no longer convey any compressed air. It is known that, in this state, oil which is normally used for lubricating the compressor 12 is sucked into the compression space as a result of the underpressure occurring during an expansion stroke of the compressor 10 and is ejected during the next compression stroke of the compressor 12 in the direction of the connected compressed-air treatment plant having consumers 58. In order to prevent this, the charge-air valve device 24 and/or the ambient-air valve device 26 do not seal off completely, but, instead, have a defined residual leak, in order to limit the intake underpressure of the compressor 12. The oil ejection from the compressor 12 is thereby reduced. The simultaneous shut-off of the first air feed 20 and of the second air feed 22 via the valve devices 24, 26 is a simple possibility for putting the compressor 12 into an energy-saving operating mode.

As long as the boost pressure provided by the turbocharger 16 lies below the adjustable boost-pressure threshold, both the charge-air valve device 24 and the ambient-air valve device 26 are in their switching states not illustrated. The compressor 12 then receives already precompressed air via the first air feed 20. The compressor 12 is optimized for the aspiration of non-precompressed air, and therefore even low boost pressures markedly increase the air volume conveyed by it. Up to a boost pressure of approximately 0.6 bar, the compressor 12 optimized for the aspiration of non-precompressed air can easily even convey already precompressed air. If the boost pressure provided by the turbocharger 16 overshoots this first limit, which is also designated as the spill-chamber boost-pressure threshold, the spill chamber 32 assigned to the compressor 12 is connected via the valve device 30 in order to lower the feed pressures occurring during the conveyance of the already precompressed air. If the boost pressure provided by the turbocharger 16 rises further and finally overshoots a further limit, designated as the boost-pressure threshold, the feed pressures which occur may damage the compressor 12 in spite of the spill chamber 32. If the boost-pressure threshold is overshot, therefore, the charge-air valve device 24 and the ambient-air valve device 26 are transferred into their switching states illustrated, and the spill chamber 32 assigned to the compressor 12 is closed again as a result of the actuation of the valve device 30. The compressor optimized for the aspiration of non-precompressed air then sucks in non-precompressed air via the second air feed 22. The connection of the spill chamber 32 may be used otherwise for reducing the conveyed air volume or for saving energy even when a large air quantity is not required.

The charge-air valve device 24 and the ambient-air valve device 26 are electrically or pneumatically actuable valve devices which, in particular, release as large a flow cross section as possible of the air feeds 20, 22 when they are in their open state. The two valve devices 24, 26 may be designed, for example, as simple and robust throttle-flap valves. Advantageously, in this case, the throttle flaps either are completely closed or are aligned in parallel in the airstream. The harmful influence of aspiration pulsations therefore cannot have any effect. The use of free-flow valves, slanted-seat valves, piston slides or ball cocks, which can likewise release very large flow cross sections in relation to the line cross section, is likewise possible.

The valve devices 24, 26 may be designed as separate 2/2-way valves. Activation may take place directly via the pressure sensor, no further data then being required by an engine control apparatus in order to switch the valve devices. If the switching of the valve devices 24, 26 takes place as a function of the engine rotational speed via the electronic control apparatus 34, the engine rotational speed is preferably read out from an engine control apparatus. In this case, in addition, the characteristic map of the engine turbocharger must be known. Furthermore, a tie-up to the CAN bus 38 is also required in order to transmit the engine rotational speed. The charge-air valve device 24 and the ambient-air valve device 26 may be combined into one common valve device. This common valve device then possesses four connections and three switching positions:

(1) an open first air feed 20 with the second air feed 22 closed;

(2) a closed first air feed 20 with the second air feed 22 open;

(3) a closed first air feed 20 with the air feed 22 simultaneously being closed.

FIG. 2 shows the conveyed air volume of differently operated compressors as a function of the engine rotational speed. The conveyed air volume ("free air delivery") is plotted on the Y-axis, while the rotational speed of the engine of the commercial vehicle is plotted in revolutions per minute on the X-axis. A first compressor characteristic curve 44 illustrates the air volume conveyed by a compressor as a function of the engine rotational speed, the compressor itself being optimized for the aspiration of non-precompressed air, and no optimizations of the conveyed air volume being carried out at all. The first characteristic curve 44 is approximately linear in the engine rotational speed range illustrated.

A second compressor characteristic curve 46 likewise illustrates the air volume conveyed by a compressor as a function of the engine rotational speed, the compressor assigned to the second compressor characteristic curve 46 being optimized for the aspiration of already precompressed air, that is to say being operated together with a turbocharger.

A third compressor characteristic curve 48 is again assigned a compressor optimized for the aspiration of non-precompressed air. In contrast to the compressor assigned to the first compressor characteristic curve 44, to generate the third compressor characteristic curve 48, already precompressed air is fed to the compressor from a turbocharger up to a spill-chamber boost-pressure threshold 42. Up to the spill-chamber boost-pressure threshold 42, the feed volume provided by the compressor according to the third compressor characteristic curve 48 is increased markedly, as compared with the first characteristic curve 44. When the spill-chamber boost-pressure threshold 42 is overshot, the feed of already precompressed air is discontinued in order to avoid damage to the compressor. The spill-chamber boost-pressure threshold 42 lies at around 0.6 bar. Depending on how robust the construction of the compressor is, a shift may also be possible or necessary. After the changeover of the air feed, the third compressor characteristic curve 48 falls to the level of the first compressor characteristic curve 44, since only non-precompressed ambient air is then sucked in by the compressor. When the spill-chamber boost-pressure threshold 42 is overshot, therefore, to generate the third compressor characteristic curve 48, the charge-air valve device and ambient-air valve device which are already known from FIG. 1 are actuated.

A fourth compressor characteristic curve 50 is generated in a similar way. In contrast to the third compressor characteristic curve 48, however, in this case, when the spill-chamber boost-pressure threshold 42 is overshot, the spill chamber assigned to the compressor is connected, in order to lower the feed pressures which arise. However, the compressor continues to be acted upon by already precompressed air from the turbocharger. With a growing engine rotational speed, therefore, the air volume conveyed by the compressor rises sharply again, as in the case of a turbocharged compressor, and, in particular, lies above the first compressor characteristic curve 44. When a boost-pressure threshold 40 which lies at around 1.5 bar is overshot, the feed pressures arising in the compressor are once more so high that they would be capable of damaging the compressor. In order to prevent this, the charge-air valve device and the ambient-air valve device are actuated, so that the compressor can then suck in only non-precompressed ambient air. At the same time, the previously connected spill chamber can be closed again, so that the air volume conveyed by the compressor falls to the level of the first compressor characteristic curve 44 again.

As is clear from FIG. 2, the compressor characteristic curve 50 according to the invention, particularly in the case of low engine rotational speeds, lies above the characteristic curve 44, 46 for an ambient-air-aspirating compressor or for a turbocharged compressor.

| Table of Reference Numerals | |
|---|---|
| 10 | Compressor system |
| 12 | Compressor |

-continued

Table of Reference Numerals

| | |
|---|---|
| 14 | Commercial vehicle |
| 16 | Turbocharger |
| 18 | Engine |
| 20 | First air feed |
| 22 | Second air feed |
| 24 | Charge-air valve device |
| 26 | Ambient-air valve device |
| 28 | Pressure sensor |
| 30 | Valve device |
| 32 | Spill chamber |
| 34 | Electronic control apparatus |
| 36 | Connection |
| 38 | CAN bus |
| 40 | Boost-pressure threshold |
| 42 | Spill-chamber boost-pressure threshold |
| 44 | First compressor characteristic curve |
| 46 | Second compressor characteristic curve |
| 48 | Third compressor characteristic curve |
| 50 | Fourth compressor characteristic curve |
| 52 | Air filter |
| 54 | Charge-air cooler |
| 56 | Cylinder |
| 58 | Compressed-air treatment plant having consumers |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressor system for use in a commercial vehicle having an engine with a turbocharger, the compressor system comprising:
    a compressor for supplying compressed air to the commercial vehicle;
    a first air feed through which air precompressed by the turbocharger is capable of being sucked-in by the compressor;
    a second air feed through which non-precompressed ambient air is capable of being sucked-in by the compressor;
    a charge-air valve device operatively arranged in the first air feed;
    an ambient-air valve device operatively arranged in the second air feed; and
    a pressure sensor operatively arranged in the first air feed, the pressure sensor determining a boost pressure provided by the turbocharger,
    wherein the charge-air valve device is arranged to allow sucking-in precompressed air provided by the turbocharger only when the boost pressure provided by the turbo charger lies below an adjustable boost pressure threshold; and
    wherein the ambient-air valve device is arranged to allow sucking-in ambient air only when the boost pressure provided by the turbocharger overshoots said adjustable boost pressure threshold.

2. The compressor system according to claim 1, wherein the compressor comprises a spill chamber connectable to a piston chamber of the compressor via a valve device.

3. The compressor system according to claim 1, further comprising an electronic control unit operatively configured to control functions of the compressor system.

4. The compressor system according to claim 3, wherein the electronic control unit comprises a coupling for a CAN bus, the electronic control unit receiving through the coupling for the CAN bus one of a current boost pressure value provided by the turbocharger and data values by which the current boost pressure is calculable.

5. A method of operating a compressor system having a compressor for supplying compressed air to a commercial vehicle with an engine having a turbo charger, the method comprising the acts of:
    sucking-in to the compressor via a first air feed precompressed air provided by the turbocharger below an adjustable boost-pressure threshold;
    sucking-in to the compressor via a second air feed non-precompressed ambient air above the adjustable boost-pressure threshold;
    wherein below the adjustable boost-pressure threshold, an ambient-air valve device closes the second air feed; and
    wherein above the adjustable boost-pressure threshold, a charge-air valve device closes the first air feed.

6. The method according to claim 5, wherein above an adjustable spill-chamber boost-pressure threshold, a valve device connects a spill chamber to a piston chamber of the compressor.

7. The method according to claim 5, further comprising the act of determining boost pressure via a pressure sensor.

8. The method according to claim 5, further comprising the act of receiving CAN bus data in an electronic control unit, said CAN bus data at least one of allowing a determination of the boost-pressure valve and providing the boost-pressure valve.

9. The method according to claim 5, wherein the first air feed is closed by the charge-air valve device and the second air feed is closed by the ambient-air valve device in order to operate the compressor in an energy-saving state.

10. The method according to claim 9, wherein in the energy-saving state, at least one of the charge-air valve device and the ambient-air valve device limits an intake underpressure of the compressor by allowing a residual leak.

11. A method of operating a compressor system in a commercial vehicle having an engine with a turbocharger, the method comprising the acts of:
    monitoring boost-pressure from the turbocharger;
    feeding precompressed air from the turbocharger to the compressor via a first air feed only when the boost-pressure is below an adjustable boost-pressure threshold; and
    feeding non-precompressed ambient air to the compressor via a second air feed only when the boost-pressure is above the adjustable boost-pressure threshold.

* * * * *